July 12, 1932.  M. ISAACSON ET AL  1,866,652
RESILIENT WHEEL
Filed Feb. 11, 1931  3 Sheets-Sheet 1
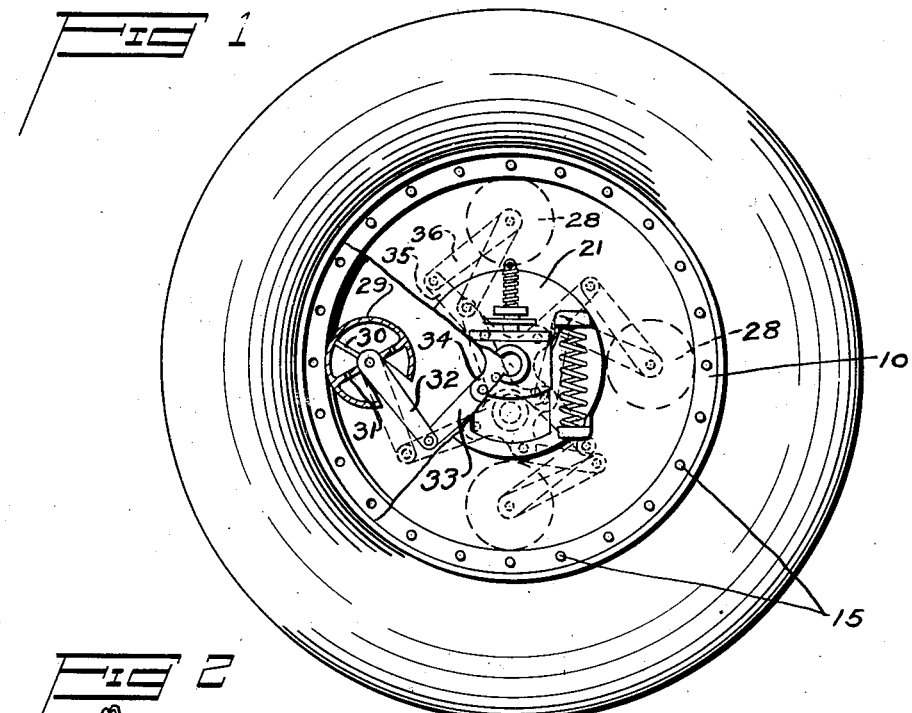
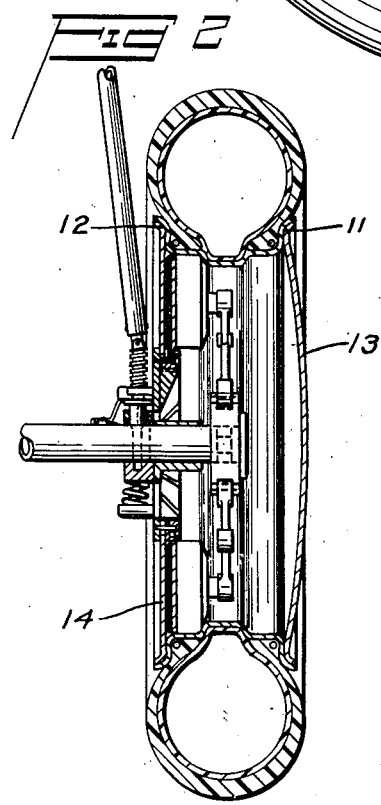
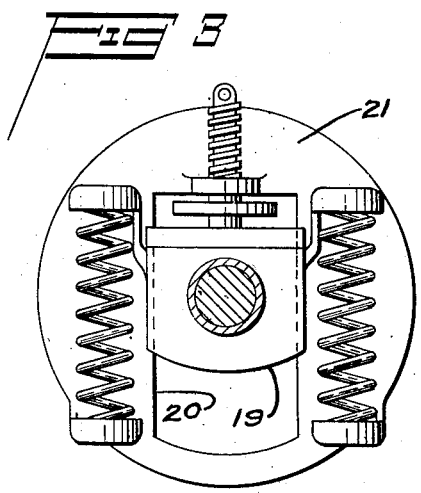
INVENTORS
MAX ISAACSON - FLAVIUS E LOUDY
BY FREDERICK R BUSSDICKER
ATTORNEY

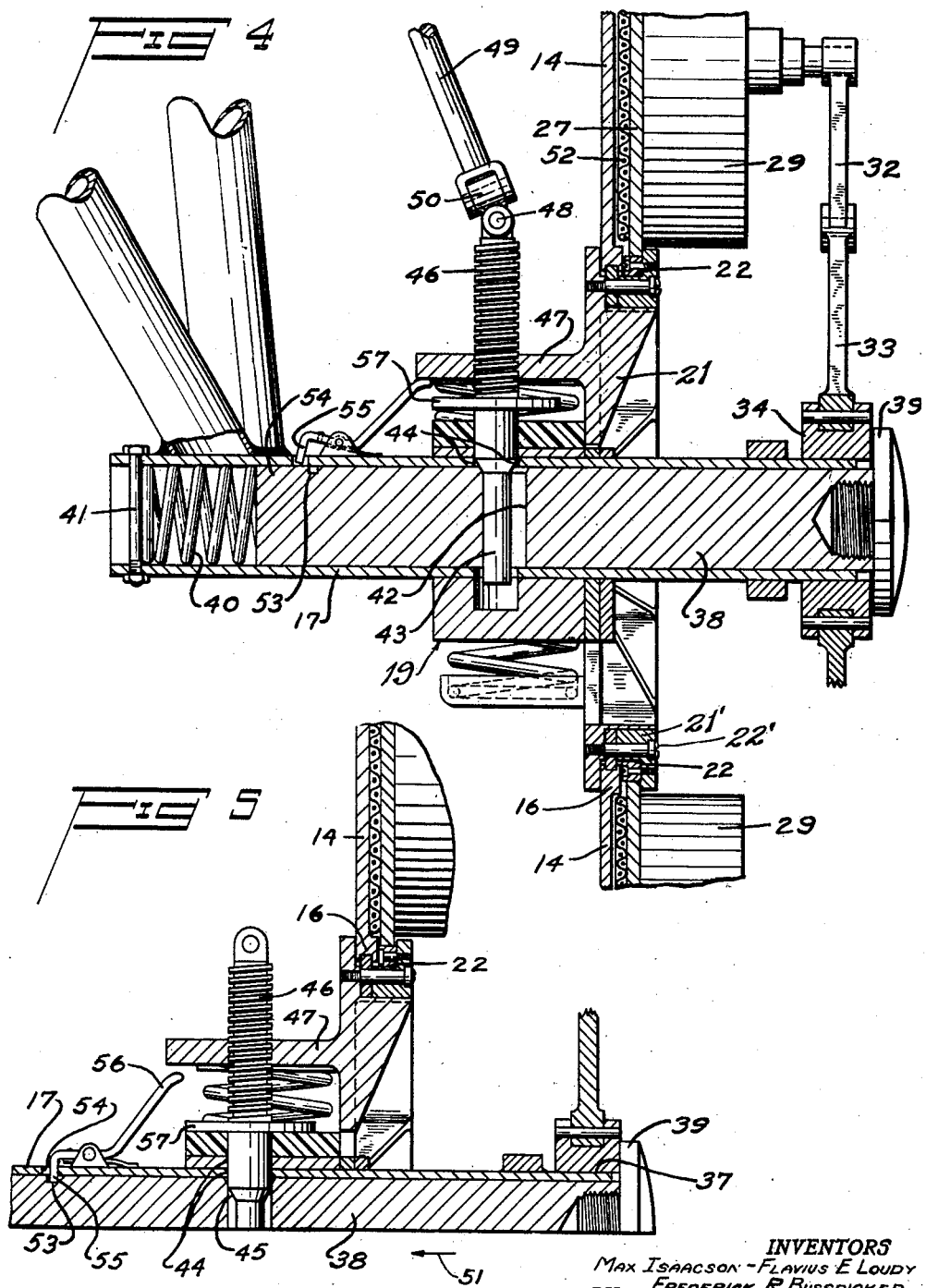

July 12, 1932.    M. ISAACSON ET AL    1,866,652
RESILIENT WHEEL
Filed Feb. 11, 1931    3 Sheets-Sheet 3
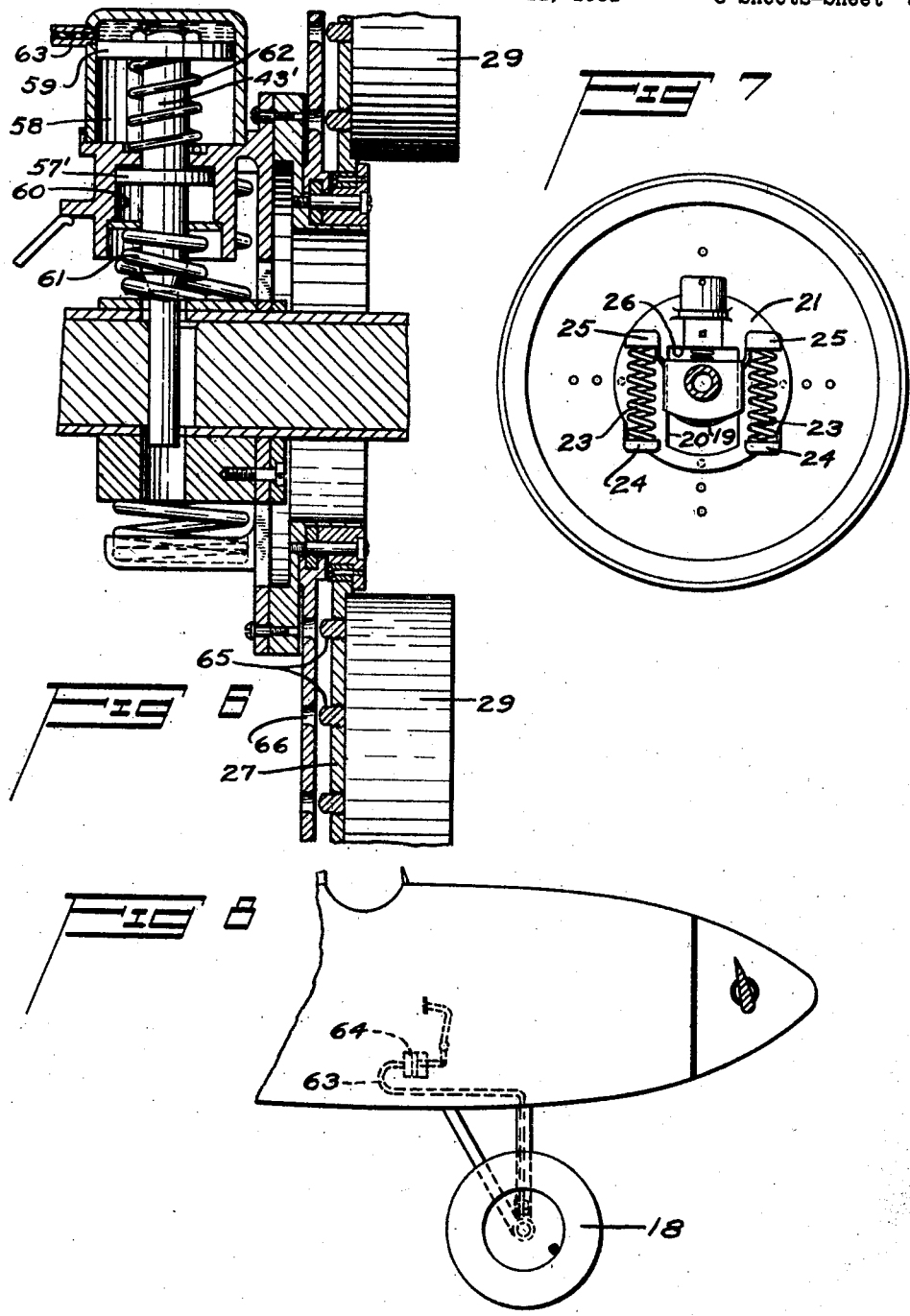
INVENTORS
Max Isaacson - Flavius E Loudy
BY Frederick R Bussdicker
ATTORNEY

Patented July 12, 1932

1,866,652

UNITED STATES PATENT OFFICE

MAX ISAACSON, OF DAYTON, FLAVIUS E. LOUDY, OF AKRON, AND FREDERICK R. BUSS-DICKER, OF DAYTON, OHIO

RESILIENT WHEEL

Application filed February 11, 1931. Serial No. 515,074.

The present invention relates generally to vehicle wheels and has particular reference to wheels adapted for use with the landing gear of an aircraft of the type in which the wheels are resiliently mounted upon the axle, the latter being transversely movable relative to the axis of rotation of the wheel against the restraining action of springs or other energy absorbing devices.

The primary object of the present invention is to provide in a wheel resiliently mounted on a fixed chassis axle energy absorbing means to effect a dampening action of the relative displacement between the wheel and axle.

Another object of the present invention is to provide in a resiliently mounted wheel of this character means whereby the relative displacement between the wheel and fixed chassis axle is dampened or cushioned and whereby the rotary motion of said wheel may be retarded.

A further object of the present invention is to provide in a wheel resiliently mounted on a fixed chassis axle of this character hydraulic dampening means rotatable with said wheel and means interconnecting said dampening means and said axle whereby a relative displacement between said wheel and axle will actuate said hydraulic means to dampen said relative displacement and simultaneously retard the rotation of said wheel.

Another object of the present invention is to provide in a wheel of this character hydraulic dampening means adapted to be actuated by relative displacement of said wheel and fixed chassis axle, means for locking said dampening means for rotation with said wheel and manual means for relatively displacing said wheel and axle when desired for effecting a braking action thereof.

A still further object of this invention is to provide in a wheel hydraulic energy absorbing means carried by said wheel and adapted to be actuated by rotation thereof for effecting a braking action by utilizing the non-compressible quality of the fluid to absorb the energy built up by said hydraulic means when in operation.

Finally, our invention is characterized by providing in a wheel resiliently mounted on a fixed chassis axle hydraulic energy absorbing means, said means comprising a fluid filled casing rotatable with said wheel and an impeller adapted to be relatively movable within said casing mechanism connected to said impeller and rotatable about the axis of rotation of said wheel and a means for shifting said mechanism to a position eccentric to the axis of rotation of said wheel whereby rotational movement of said wheel will effect an actuation of said hydraulic means, said hydraulic means in being actuated being adapted to force a non-compressible fluid through one or more restricted apertures, the size of which may be regulated according to the amount of energy which it is desired to absorb.

Our invention also consists in certain other features of construction and in the combination and arrangement of the several parts to be hereinafter fully, clearly and concisely described and defined in the appended claims, and illustrated in the accompanying drawings, in which:

Fig. 1 is a side elevation of a wheel constructed in accordance with the principles of the invention, generally showing the axle mounting and arrangement of dampening devices therein;

Fig. 2 is a sectional view taken on the line 2—2 of Fig. 1;

Fig. 3 is an enlarged detail view of the axle mounting for the wheel showing a type of spring suspension means for resiliently mounting the wheel on the axle;

Fig. 4 is an enlarged detail view showing the method of mounting the dampening devices on the wheel, together with a manually operated mechanism for effecting braking action, which latter is shown in unlocked position;

Fig. 5 is an enlarged partial detail view similar to Fig. 4, illustrating the brake mechanism with the parts arranged in a locked position;

Fig. 6 is an enlarged detail view of a modified form of brake control mechanism;

Fig. 7 is a side elevation of the modified form of brake operating means as applied to the axle assembly of the wheel; and Fig. 8 is a side elevation of a portion of an aircraft fuselage with wheels embodying the invention mounted thereon and illustrating diagrammatically the operation of the hydraulic brake control from the pilot's compartment.

Referring more particularly to the drawings wherein corresponding parts are designated by like numerals throughout the several views thereof, the wheel construction in our embodiment of the invention herein illustrated comprises generally a rim 10 having short projecting flanges 11 and 12 integral therewith and adapted to receive and hold a pneumatic rubber tire in the ordinary manner.

To exclude the dust and dirt from the interior of the wheel, a suitable sheet metal disk 13 may be secured in any suitable maner at its periphery to the outer edge of the wheel rim to turn therewith and form a closure for the outer side of the entire wheel.

The inner side of the wheel, or that into which the axle projects is provided with a main supporting plate 14, which is secured at its periphery to the inner edge of the wheel rim, as by rivets 15 or the like, the supporting plate being suitably provided with a hub portion 16.

As shown in the drawings the aircraft chassis includes a landing gear having a fixed supporting element or main axle 17 upon the ends of which the ground or supporting wheels, indicated as a whole by numeral 18, are mounted and each end of this axle is provided with a head member 19 extending transversely of the longitudinal axis of the axle in a perpendicular position, said head member being welded or otherwise secured to the axle and comprising portions extending a considerable distance above and below the plane of the axle and formed to slide freely in the guide slot or guide way 20, extending diametrically of and in a vertical direction relative to the body or fixed nonrotating center portion 21 of the wheel, which body portion is formed with a suitable bearing surface 22 forming a stub axle adapted to accommodate the hub portion 16 above mentioned. It is preferable to have the wheel and dampening means as an assembly and to the end a removable annular ring 21' is provided as shown in Fig. 4, which is secured to the body portion 21 by means of machine screws 22' so as to permit removal of the wheel 14 and plate 27 carrying the dampening members, hereinafter referred to as a unitary assembly. Any suitable means for yieldingly supporting the wheel may be provided, but in the present instance to resiliently support the axle 17 within its guides 20, a plurality of springs 23, or members of other suitable resilient material and construction are provided, the lower ends of which are contained in brackets 24 carried upon the body portion as shown in Fig. 3, the upper ends of each spring being engaged in projecting ears 25 provided on the sides of the head member 19. The entire weight of the axle and chassis is thus resiliently suspended from the body portion of the wheel by means of these springs, the axle head sliding freely in its ways, but being resisted in its downward movement by the springs and limited in its upward movements in the ways by the upper end 26 of the guide way, which latter is so located that when the axle head member is in contact therewith the longitudinal axis of the axle will coincide with the axle of the wheel. The springs are preferably strong enough so that they will normally maintain the axle positioned concentric to the axis of rotation of the wheel, but will yield under heavy loads permitting the head to move downward in its guides.

According to the present invention, it is desired to provide means to dampen or cushion the aforementioned relative displacement between the axle head member and the body portion of the wheel and with this aim in view a mounting plate 27, coaxial with the axis of rotation of the wheel and arranged in parallel alignment with respect to the main supporting plate 14, is provided, which is mounted upon the center body portion of the wheel and normally free to rotate relative thereto. A plurality of concentrically arranged energy absorbing units or dampening devices 28, which may be of any conventional type, are mounted upon the plate 27. In the present instance, and for the purpose of illustration, these dampening devices are shown as comprising fluid filled casings 29, having relatively movable impellers 30 operating therein, each having one or more restricted apertures 31 provided therein for the passage of fluid, the size of which may be regulated according to the amount of pumping action or energy absorption desired during the time the dampening devices are in operation.

Any suitable linkage for effecting actuation of the impellers may be employed, but in the present instance these impellers are shown as carrying externally operated control arms 32, to each of which is pivotally attached operating levers 33 which connect at their free inner ends to a spider 34. A master control arm 35 formed integral with the spider 34 attached directly to the one control arm 36 as shown in Fig. 1 to insure positive operation of the linkage. The spider is provided with a suitable journal 37 adapted to rotate freely upon the outer end of the axle and movable longitudinally on said axle, as will be noted by observing Figs. 4 and 5.

From the description thus far and by observing the drawings it will be apparent that as long as the axle is concentric with the axis of rotation of the wheel, actuation of the dampening devices when the wheel is rotating will not be effected. On the other hand, when, for instance, load is applied to the axle, thus effecting a relative displacement between the axle and fixed center portion of the wheel, consequent rotation of the wheel while the axle is eccentric to the axis of rotation of the wheel will cause the impellers of the dampening devices to be actuated to immediately effect a dampening action of the relative displacement between the axle and center portion of the wheel by forcing the relatively non-compressible fluid within the casing through their respective restricted apertures. It will also be apparent that rotation of the wheel will effect a continuous and progressive actuation of the dampening devices as a result of the oscillatory movement imparted the linkage interconnecting the dampening devices and the axle during the time that the wheel is rotating by reason of the relative displacement between the axle and center portion of the wheel.

The present invention contemplates the provision of manual means for effecting a braking action of the wheels when desired to retard the forward motion of the aircraft after it has landed and for this purpose we provide a shaft 38 slidably mounted within the axle 17, as shown in Fig. 4, the outer end of which is provided with a flanged member 39 adapted to bear against the outer face of the spider 34. A tension spring 40, contacting at its one end against the inner end of the shaft 38 and against a stop bolt or pin 41 at its other end, tends to normally maintain the flanged end of the shaft from engagement with the spider member.

Intermediate its ends the shaft 38 is provided with a transverse slot 42, within which is adapted to be slidably disposed a plunger 43, which is in turn freely slidable in openings 44 formed in the head member and axle, as shown in Figs. 4 and 5. The lower portion of the plunger is of smaller diameter than the upper portion, as will be noted, a bevelled surface 45 joining these portions aforementioned to provide a cam surface adapted to engage with the upper edge of the slot 42. For purposes of adjustment the upper end of the plunger is provided with screw threads indicated by numeral 46, which are adapted for screw threaded engagement within a threaded opening provided in an extended portion 47 carried by the non-rotating body portion of the wheel. The extreme outer end 48 of the plunger may be connected to a control rod 49 adapted for manual operation from the pilot's cockpit through the medium of a universal joint connection 50. In view of the foregoing description taken in connection with the accompanying drawings, when it is desired to effect a braking action of the rotation of the wheel the operator has but to turn the control rod in the direction indicated by the arrow; in so doing the plunger 43 is caused to move downwardly and the cam surface 45 in contacting against the upper edge of the opening 42 moves the shaft 38 longitudinally on the axle in the direction of the arrow 51. At the same time the flanged member 39 in contacting with the spider 34 bodily shifts the mounting plate 27 to frictionally engage the inner face of the wheel supporting plate, as shown in Fig. 5. To provide a smooth action and insure against slippage of the parts, suitable friction means, such as a disk of composition brake lining 52 or the like may be employed, as illustrated in Figs. 4 and 5, to effect a positive interlocking of the mounting plate and the wheel support.

The shaft 38 in being shifted in the direction indicated, moves an opening 53 provided in its upper peripheral edge into registry with a correspondingly shaped opening 54 provided in the axle to permit a spring controlled locking lug 55, pivotally mounted on the axle and normally positioned under tension within the opening 54, to drop into the opening 53 and thus lock the shaft and axle against relative movement. During the initial period of operation of the brake controlling mechanism, the locking lug 55 is prevented from engaging the shaft 38 by reason of the fact that an arm 56 forming an integral part of the lug contacts against the extended portion 47 of the body portion of the wheel and normally maintains the locking lug in an inoperative position. In order to allow the locking lug to drop into the opening 54, thus relatively locking the shaft and axle, positive relative displacement between the wheel body portion and axle head member must be effected and to this end the plunger 43, as shown in Figs. 4 and 5, is provided with a shoulder 57, which, in the operation of the mechanism heretofore described is normally positioned immediately above the axle head member and which, when the plunger 43 is being actuated, moves into engagement with the axle head member, as shown in detail in Fig. 5, to effect a positive relative displacement between the said axle head member and wheel body portion. In so doing the locking lug 55 is permitted to drop into the opening 54 in the manner prescribed. It will be apparent that further relative displacement between the wheel and axle caused by the wheel in running over obstructions on the ground, will not in any manner effect the braking action, inasmuch as the axle and shaft being relatively locked the plunger 43 will during this time be freely slidable within the slot 42. It will also be apparent in locking the mounting plate carrying the dampening devices to the wheel supporting plate that the wheel in rotating will actuate the dampening devices, the resultant resistance built up in the dampening devices being effective in retarding the rotation of the wheel and also simultaneously effecting a dampening effect of the relative displacement between the axle head member and the wheel body portion.

Any desired amount of braking and/or dampening action may be obtained depending upon the extent of relative displacement which may be effected between the relatively movable members aforementioned. Should braking action alone be desired, the pilot or operator of the mechanism heretofore described has but to move the axle head member downwardly to the lowest limits in its guide ways, at which time it will be obvious that the axle head member and body portion of the wheel being relatively fixed, actuation of the dampening device will only be effective in obtaining maximum braking of the wheel.

If desired the brake control mechanism may be hydraulically operated and to this end, as illustrated in the modification shown in Figs. 6 and 7, the body portion of the wheel may be provided with a cylinder 58 within which a piston 59 carrying a plunger 43' as aforementioned, is adapted to be hydraulically operated. In this instance, the shoulder 57' of the plunger is adapted for operation in the inner bore of a guide chamber 60 provided on the lower end of the hydraulic cylinders, which when moved downwardly under hydraulic action engages with a spring 61 contacting at its lower end with the axle head member to resiliently displace the said axle head member relative to the body portion of the wheel. The piston 59 may be returned to neutral position through the medium of the coil spring 62 engaging the same and the lower end of the cylinder 58 as illustrated. The cylinder may be connected to any source of fluid supply, in the present instance a pipe 63 having communication with a master control cylinder 64, which may be located in pilot's compartment and having a foot pedal operated piston thereon serving as a means of supplying fluid to the piston 59 whereby to effect brake operation. If desirable the mounting plate carrying the dampening devices may be provided with a series of radially spaced pins 65 adapted for clutching engagement with a plurality of correspondingly placed holes 66 provided in the inner face of the wheel supporting plate.

From the foregoing description it will be seen that simple yet efficient means are provided for accomplishing the objects of the invention, but while the elements herein shown and described are well adapted to perform the functions set forth, it is obvious that various minor changes may be made in the proportions, shape and arrangement of the several parts without departing from the spirit and scope of the invention as defined in the appended claims.

Having thus described our invention, what we claim as new and desire to secure by Letters Patent is:—

1. In a vehicle wheel assembly, dampening fluid means carried by said wheel assembly, means adapted to be movable relative to said wheel and independent of the rotation thereof, and means interconnecting said dampening means and said movable means for effecting a dampening action of said relative movement.

2. In a vehicle wheel assembly, fluid dampening means carried by said wheel assembly, and rotatable relative to said wheel, means adapted to be movable relative to said wheel and independent of the rotation thereof, and mechanism interconnecting said dampening means and said movable means whereby movement of said movable means relative to said wheel actuates said dampening means to effect a dampening action of said relative movement.

3. In a vehicle wheel assembly, fluid dampening members carried by said wheel assembly, said dampening members and wheel being relatively movable, and an element movable relative to said wheel and independent of the rotation thereof for actuating said dampening members whereby relative movement of said wheel and element effects a dampening action of said relative movement.

4. In a vehicle wheel assembly, a plurality of fluid dampening members carried by said wheel assembly, said members and wheel being relative rotatable about an axis concentric with the axis of rotation of said wheel, and an element normally substantially coaxial with the axis of rotation of said wheel and transversely movable relative thereto for actuating said dampening means whereby movement of said element eccentric to the axis of rotation of said wheel actuates said dampening member to effect a dampening action of said movement.

5. In a vehicle wheel assembly, a plurality of fluid dampening members carried by said wheel assembly, said dampening members and wheel being relatively rotatable, and an element normally substantially coaxial with the axis of rotation of said dampening members for actuating said members, said element being free to move transverse of the axis of rotation of said dampening members whereby movement of said element relative to said dampening members will actuate said members to effect a dampening action of said relative movement.

6. In a vehicle wheel assembly, fluid dampening means carried by and rotatable with said wheel assembly, and an element movable relative to said wheel and independent of the rotation thereof for actuating said dampening members whereby movement of said element to said wheel effects a dampening action of said relative movement and a braking action of said wheel.

7. In a vehicle wheel, dampening means rotatable with said wheel, and an element adapted to be movable relative to said wheel and independent of the rotation thereof for actuating said dampening means whereby movement of said element relative to said wheel actuates said dampening means to effect a dampening action of said movement and a braking action of said wheel.

8. In a vehicle wheel, dampening means rotatable with said wheel and an element normally substantially concentrically positioned relative to the axis of rotation of said wheel and adapted to be movable independently of the rotation thereof for actuating said dampening means whereby movement of said element to any position eccentric to the axis of rotation of said wheel will actuate said dampening means to simultaneously effect a dampening action of said movement and a braking action of said wheel.

9. In a vehicle wheel, a plurality of dampening members rotatable with said wheel and arranged concentric with the axis of rotation thereof, and an element normally substantially coaxial with the axis of rotation of said wheel and adapted to be movable to positions eccentric relative thereto for actuating said dampening members whereby movement of said element eccentric to the axis of rotation of said wheel will actuate said dampening members to simultaneously effect a dampening action of said relative movement and a braking action of said wheel.

10. In a vehicle wheel, dampening means carried by said wheel, said dampening means and wheel being normally relatively rotatable, an element adapted to be movable relative to said wheel and independent of the rotation thereof, mechanism interconnecting said dampening means and element for effecting a dampening action of said relative movement, locking means associated with said element for locking said dampening means to said wheel whereby to effect a braking action of said wheel when said element is moved relative to said wheel, and manually operated means for actuating said locking means.

11. In a vehicle wheel, dampening means carried by said wheel, said dampening means and wheel being normally relatively rotatable, an element adapted to be secured to a vehicle frame and movable relative to said wheel and independent of the rotation thereof, mechanism interconnecting said dampening means and movable element for effecting a dampening action of the relative movement between said wheel and element, locking means carried by said element and connected to said mechanism for locking said dampening means to said wheel whereby to effect a braking action of said wheel when said element is moved relative to said wheel, and a manually operated member for operating said locking means.

12. In a vehicle wheel having an axle transversely movable relative to the axis of rotation of said wheel, dampening means carried by said wheels, said dampening means and wheel being normally relatively rotatable, an element adapted to be secured to a vehicle frame and movable relative to said axle and independent of the rotation of said wheel, mechanism interconnecting said dampening means and movable element for effecting a dampening action of the relative movement between said axle and movable element, locking means carried by said element and engaging said mechanism for locking said dampening means to said wheel whereby to effect a braking action of said wheel when said element is moved relative to said wheel, and a manually operated member carried by said axle for operating said locking means, said operating member and axle being relatively movable.

13. In a vehicle wheel having an axle transversely movable relative to the axis of rotation of said wheel, dampening means carried by said wheel, said dampening means and wheel being normally relatively rotatable, an element adapted to be secured to a vehicle frame and freely movable up or down relative to said axle and independent of the rotation of said wheel, mechanism interconnecting said dampening means and movable element for effecting a dampening action of the relative movement between said axle and movable element, locking means carried by said element and in operative engagement with said mechanism for locking said dampening means to said wheel whereby to effect a braking action when said element is moved relative to said wheel, a manually operated member supported by said axle for actuating said locking means, and means carried by said actuating member and cooperating with said movable element for moving said element relative to said axle whereby to control the degree of relative movement between said axle and said movable element.

14. In a landing gear for aircraft, a wheel assembly, fluid dampening means carried by said wheel assembly, a supporting element adapted to be secured to said aircraft for supporting said wheel, said supporting element and wheel being relatively and independently movable, and mechanism interconnecting said supporting element and dampening means for effecting a dampening action of said relative movement.

15. In a landing gear for aircraft, a wheel, fluid dampening means carried by said wheel, said dampening means comprising a movable member, and a relatively fixed member, a supporting element adapted to be secured to said aircraft for supporting said wheel, said supporting element and wheel being relatively movable, and mechanism interconnecting said element and said movable member for dampening said relative movement.

16. In a landing gear for aircraft, a landing wheel, fluid dampening means carried by and rotatable relative to said wheel, said dampening means comprising a movable member and a relatively fixed member, a supporting element adapted to be secured to said aircraft for supporting said wheel, said supporting element and wheel being relatively movable, and mechanism interconnecting said movable member and supporting element whereby relative movement between said wheel and supporting element will actuate said dampening means to effect a dampening action of said relative movement.

17. In a landing gear for aircraft, a landing wheel, a plurality of fluid dampening devices carried by and rotatable relative to said landing gear, each dampening device comprising a movable member and a relatively fixed member, a chassis strut adapted to be secured to said aircraft for supporting said wheel, said chassis strut and wheel being relatively movable, and mechanism interconnecting the movable members of each dampening device and chassis strut, and movable with said strut, whereby relative movement between said wheel and chassis strut will actuate said dampening devices to effect a dampening action of said relative movement.

18. In combination with a resilient wheel, two non-rotatable parts, yieldable means for resisting the relative displacement of said parts from their normal relative positions and fluid dampening means associated with said parts for dampening relative displacements thereof.

19. In combination with a resilient wheel, two parts movable relative to one another in a vertical plane, yieldable means for resisting relative displacement of said parts from their normal relative positions, fluid damping means associated with said parts for dampening relative displacements thereof and a wheel mounted on one of said parts and rotatable independently of said dampening means.

20. In combination with a resilient wheel, two parts capable of movement relative to one another in a vertical plane, yieldable means for resisting relative displacement of said parts from their normal relative positions, fluid dampening means associated with said parts and comprising a fixed member and a relatively movable member, a wheel mounted on one of said parts and rotatable independently of said dampening means, and mechanism interconnecting said movable member and one of said parts for dampening relative movement between said parts.

21. In a resilient wheel, in combination, a rotatable part, two non-rotatable parts guided upon each other for vertical movement, yieldable means for resisting relative displacement of said parts from their normal relative position, fluid dampening means associated with said parts for effecting a dampening action of the relative movement between said non-rotatable parts, and means adapted to interconnect said dampening means and rotatable part to retard the rotation of said rotatable part when said dampening means are in operation.

22. In combination with a resilient wheel, a rotatable part, two non-rotable parts guided upon each other for vertical movement yieldable means for resisting relative movement of said non-rotatable parts from their normal relative position, one of said non-rotatable parts forming a main axle, the other part forming a stub axle upon which said rotatable part rotates, fluid dampening means associated with said parts, said fluid dampening means comprising a fixed member and a relatively movable member, and mechanism interconnecting said movable member and main axle for effecting a dampening action of the relative movements between said non-rotatable parts and for retarding rotation of said rotatable part when said dampening means are in operation.

23. In combination with a resilient wheel, a rotatable part, two non-rotatable parts guided upon each other for vertical movement, yieldable means for resisting relative movement of said non-rotatable parts from their normal relative position, one of said non-rotatable parts forming a main axle, the other non-rotatable part forming a stub axle upon which said rotatable part is mounted for rotation, fluid dampening means adapted for selective rotation with said rotatable part, said means comprising a fixed member and a relatively movable member, said fixed member cooperating with said rotatable part, said movable member cooperating with said main axle whereby relative displacement of said rotatable part and main axle effects a dampening action of said relative displacement and means for interconnecting said dampening means and rotatable part to retard the rotation of said part.

In testimony whereof we affix our signatures.

MAX ISAACSON.
FLAVIUS E. LOUDY.
FREDERICK R. BUSSDICKER.